United States Patent [19]

Mérouge et al.

[11] 4,378,060
[45] Mar. 29, 1983

[54] BRAKING DEVICE FOR A HIGH-INERTIA ROTOR

[75] Inventors: Gilbert Mérouge, Bavilliers; Joseph de Vaulx, Belfort, both of France

[73] Assignee: Alsthom-Atlantique, Paris, France

[21] Appl. No.: 273,274

[22] Filed: Jun. 12, 1981

[30] Foreign Application Priority Data

Jun. 12, 1980 [FR] France .................. 80 13072

[51] Int. Cl.³ .......................................... F16D 65/853
[52] U.S. Cl. .......................... 188/264 CC; 188/71.6; 415/123; 415/176; 310/54
[58] Field of Search .......... 188/71.6, 264 D, 264 CC, 188/218 XL; 192/70.12, 113 B, 113.R; 310/54, 58, 60 R, 157; 415/123, 175, 176

[56] References Cited

U.S. PATENT DOCUMENTS 1,859,709  5/1932  McIntyre et al. ............... 188/264 D
3,007,556 11/1961  Eames ........................... 192/113 B
4,013,148  3/1977  Kobelt .

FOREIGN PATENT DOCUMENTS 1060980  7/1959  Fed. Rep. of Germany .
1288377  1/1969  Fed. Rep. of Germany .
 477270 10/1975  U.S.S.R. ............................ 188/315

Primary Examiner—Robert J. Spar
Assistant Examiner—Robert J. Oberleitner
Attorney, Agent, or Firm—Sughrue, Mion, Zinn, Macpeak and Seas

[57] ABSTRACT

The segments (1) of the braking track (112) fixed to the rotor of an alternator driven by a water turbine are cooled by circulating water by means of a thermosiphonic effect from tanks (5) which are also fixed to the rotor.

Application to the security of safety water-driven turbo-alternator units.

5 Claims, 3 Drawing Figures

BRAKING DEVICE FOR A HIGH-INERTIA ROTOR

BACKGROUND OF THE INVENTION

The invention relates to a braking device for a high-inertia rotor.

A high-power water-driven alternator is usually mechanically braked by friction between a steel track integral with the rotor against brake linings moved by the pistons of stationary cylinders.

The friction forces which appear when the brakes are applied are designed to be sufficient to overcome both the angular momentum of the rotor and the residual motor torque of the turbine due to leakage from its inlet manifold even when in the closed position, in order to slow the rotor down in a time which is compatible with the operation of the machine. The quantity of heat produced by friction is proportional to the product of the friction forces multiplied by the distance traveled by a point of the track of the rotor relative to a stationary observer.

The dissipation of this quantity of heat sets problems which are tricky to solve mainly on very powerful machines in which the rotor inertia is considerable and in which the water inlet manifold which feeds the turbine allows a high leakage flow to pass even when it is required to close the manifold completely to stop the alternator. The difficulty resides in the fact that heat is produced very much more rapidly than it can be dissipated naturally, in which case if suitable precautions are not taken, there occur local heating, deformation, excessive wear, and pollution of the machine by powdered material worn off the track and off the linings of the brake cylinders.

This is due to the fact that the coefficient of heat exchange between the metal of the track and the air is low. Also the heat emitted on the friction surface is stored in the mass of the track and flows only slowly in the ambient air.

In most known devices the tracks are constituted by solid steel segments and heat accumulates in their mass, but since the heat conductivity of steel is poor, the distribution of the temperatures is not homogenous. This limits the uses to which such tracks can be put.

Preferred embodiments of the present invention provide a braking device for a high-inertia rotor by which an increased braking capacity can be obtained without danger of damage.

SUMMARY OF THE INVENTION

The present invention provides a braking device for a high-inertia rotor which rotates in a predetermined direction about an axis wherein the braking device comprises:

a circular braking track fixed coaxially on said rotor and composed of successive water-cooled metal segments, each segment constituting a closed chamber with an inlet and an outlet for the water;

a succession of stationary brake cylinders disposed adjacent to said track in a position suitable to thrust brake linings against said track;

a water tank fixed on the rotor for each segment or hydraulically interconnected group of segments, said tank being disposed radially nearer to the axis of the rotor than its corresponding segment and being oriented angularly to the rear of said segment relative to the direction of rotation of the rotor, whereby both centrifugal force and the deceleration force due to braking tend to urge water from said tank towards said segment; and inlet pipes and outlet pipes which connect said tank respectively to said inlet and to said outlet of said segment to form a segment cooling circuit and to allow water to circulate in this circuit by the thermosiphonic effect which results firstly from the rise in temperature of the water in the segment during braking and secondly from the presence of centrifugal and deceleration forces.

DESCRIPTION OF KNOWN PRIOR ART

U.S. Pat. No. 4,013,148 (Kobelt) describes a hollow braking disk provided with fins inside it which are cooled by circulating a current of water which comes from the outside via connections. Also, published German patent application No. 1,288,377 (Messerschmitt) describes a hollow braking disk which contains a store of cooling water and is provided with safety valves which allow the removal of vapour in the case of high overpressure. However, such hollow disks are not adapted to braking a rotor of such high inertia as that of a large hydraulic alternator whose braking track is constituted by a succession of segments and is capable of absorbing braking energy exceeding 100 Mj, e.g. 750 MJ or more, in normal braking, and 5,400 MJ in emergency braking.

BRIEF DESCRIPTION OF THE DRAWINGS

A non-limiting description is given hereinafter with reference to the accompanying schematic drawings to show how the invention can be brought into effect. It must be understood that without going beyond the scope of the invention, the components described and illustrated can be replaced by others which perform the same technical functions. When a component is illustrated in several figures, it is designated therein by the same reference symbol.

DESCRIPTION OF PREFERRED EMBODIMENTS

Figure 1:
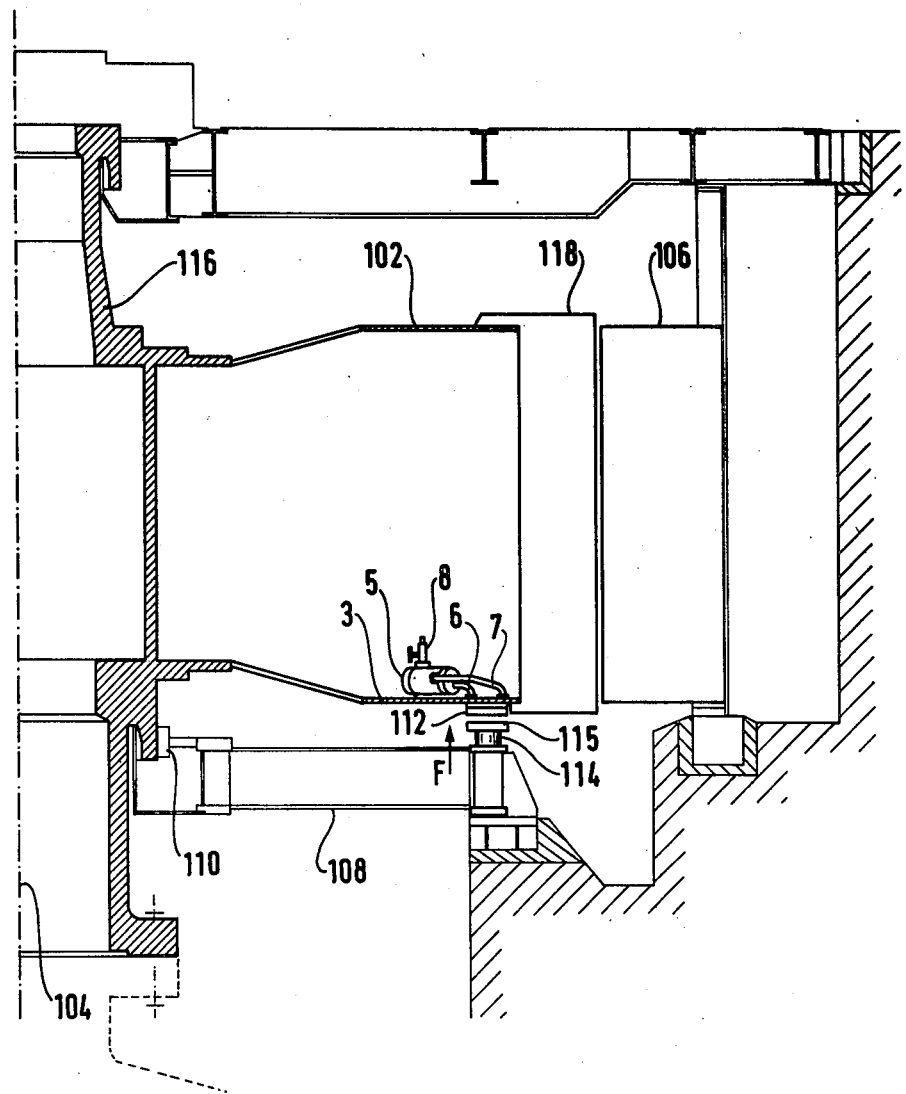
FIG. 1 schematically illustrates an alternator provided with a braking device in accordance with the invention. The figure is a cross-section of the alternator in a plane which passes through its vertical axis.

The braking track can be stationary or moving.

The example described corresponds to a segmented moving track which makes it possible to brake a rotor 102 having a vertical axis 104 in an alternator whose stator is referenced 106. A stationary spider 108 supports the bearings 110 of the rotor which is made to rotate by a water turbine (not illustrated) disposed coaxially beneath the spider.

The braking track is in the form of a circular ring 112 disposed coaxially with the rotor and fixed to the lower surface thereof on the wheel disk 3 which connects the shaft 116 to the windings 118. The braking track has an inside diameter of 9500 mm and an outside diameter of 10300 mm, for example. A suitable number, e.g. 24, of vertically oriented brake cylinders 114, are fixed on the spider 108 beneath the braking track. The piston head of each brake cylinder has a brake lining 115 which the piston applies against the track 112 when the rotor is to be stopped.

Figure 3:
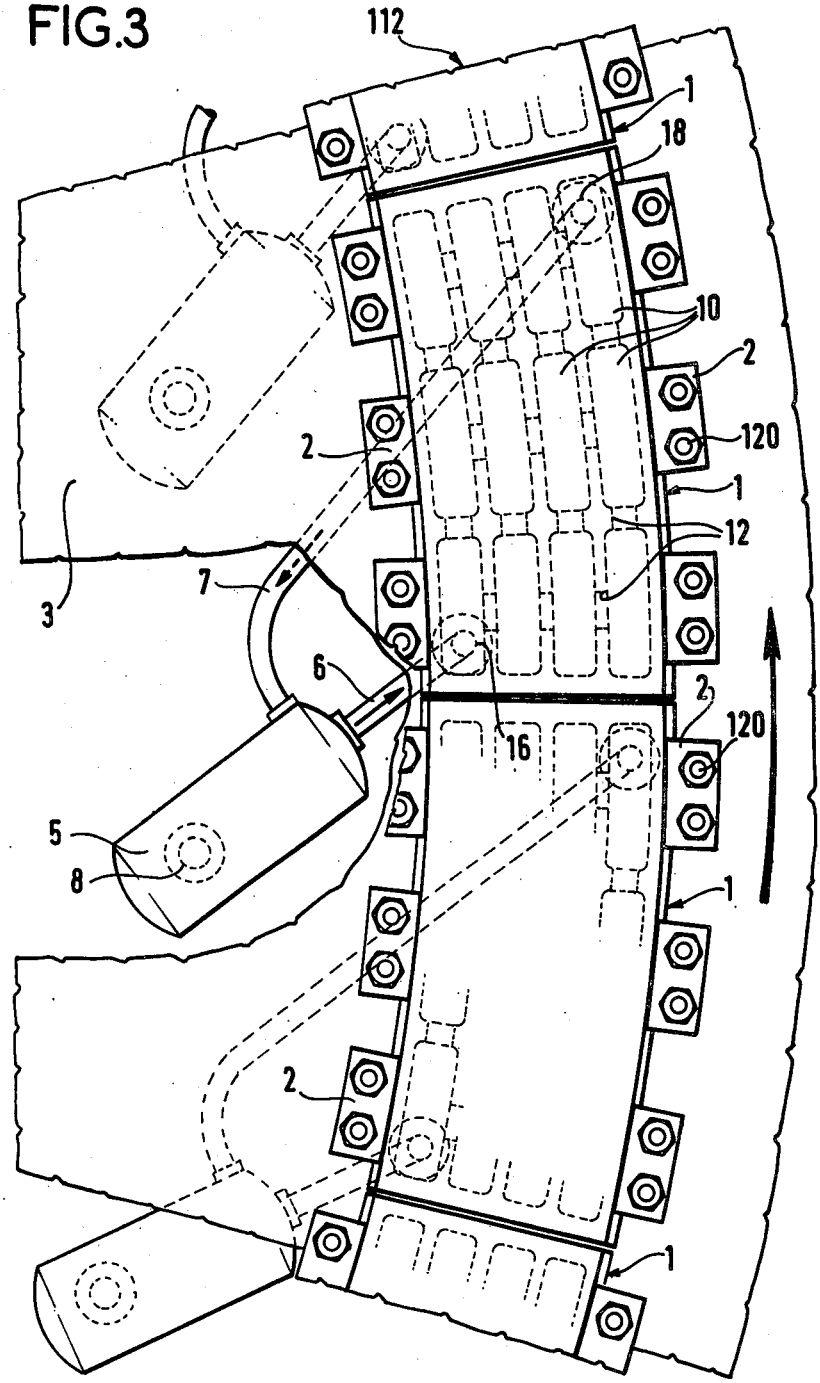
FIG. 3 illustrates the same device in a view along arrow F of FIG. 1.

FIG. 3 illustrates a few segments 1 of the brake track 112. The complete track is constituted by 30 identical segments disposed side by side around the same circumference. Each segment is made of cast steel and has three radially aligned groups of four cavities 10 which communicate with one another via holes 12. The partitions which separate the cavities maintain the shape of the segment despite local heating and they increase the surface area of heat exchange with water. The upper (non-braking) surface of each segment is closed by closing metal sheets 14 welded all around the segment and to the partitions which separate the cavities. A water inlet 16 is situated at the trailing end of the segment relative to the direction of rotation and on its inside diameter. A water outlet 18 is situated at the leading end of the segment and on its outside diameter.

Figure 2:
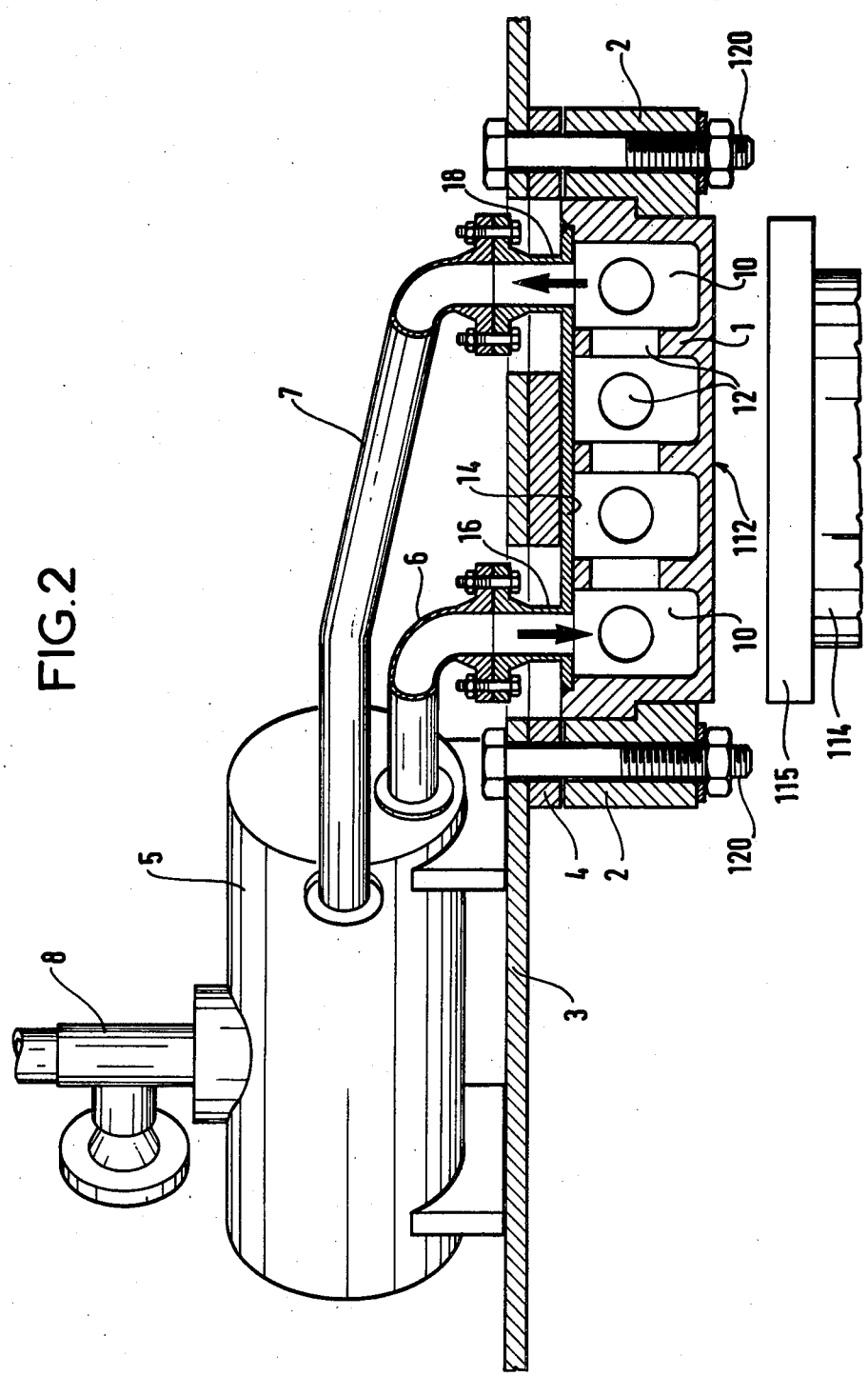
FIG. 2 illustrates a detail of FIG. 1, showing on an enlarged scale a portion of this braking device with a partial cross-section on two levels.

FIG. 2 illustrates the installation which corresponds to each segment.

The segment 1 is supported by studs 2 fixed by means of bolts 120 on the lower wheel disk 3 of the rotor shim 4 is inserted between the disk and the stud to compensate for defects in the planeness of the disk. The studs disposed in the middle of the length of the segment have cotters, not illustrated, which enter the segment to fix its position rigidly. The other studs allow the segment to expand circumferentially.

In operation, when rotating at rated speed, the water is centrifuged outwardly. All the water in a tank 5 is driven outwardly such that the segment 1 and pipes 6 and 7 connecting the segment to the tank 5 are completely filled with water, remaining in the tank 5 only at its outer end.

When the unit is to be stopped, the supply manifold is closed and the rotor slows down. Inertia deforms the shape of the water surface in the tank 5, but providing axis of the tank is suitably orientated to take this component into account i.e. is not strictly radial, the segment and the pipes 6 and 7 remain full of water.

If, as illustrated, the pipe 7 is connected substantially to the leading edge of the tank ahead of the pipe 6, inertia causes water to circulate in the circuit formed by the pipes 6 and 7, the tank 5 and the segment 1.

The rotor speed decreases and reaches the speed at which the mechanical brakes are designed to be applied.

The brake linings on the pistons then come into contact with the track which heats up and heats the water which it contains. A thermosiphonic circulation effect is set up due to the reduction in specific gravity of the water in the segment as this water is heated to a higher temperature than that of the water in the tank. This thermosiphonic effect accelerates the already started circulation of the water. As the temperature rises, the pressure rises in the tank. The heat produced by friction is then stored in the mass of the segments and in the mass of the water. The rotor is completely stopped before the temperature and the pressure reach their design limit values.

Valves 8 remain closed and the system does not lose any water. The braking system must be allowed to cool before further braking.

In the case of accidental emergency braking (e.g. with the brakes applied when the rotor speed is too high), everything happens initially as described, above but the rotor does not stop when the temperature and the pressure reach their design limit values. The valves 8 open and let steam escape. As long as all the water is not transformed into steam, the temperature remains stable due to the fact that a large quantity of heat is absorbed by the evaporation of the water.

The track can thus absorb a large amount of energy (e.g. three times more than during normal braking). This gives it a wide safety margin. Water is brought into the tank after cooling to make up the normal level.

Of course, a single tank can be used for a group of several successive segments hydraulically connected in series for this group to constitute a functional equivalent of the previously described segment 1.

The advantages of the invention are as follows:

proper distribution of the temperature in the thickness of the track, this avoiding detrimental deformation;

a high heat capacity which allows a very high inertia rotor to be braked, the energy which can be absorbed being, for example, 750 MJ during normal braking and 5400 MJ during emergency braking;

no intervention is necessary after normal braking, since the pressure in the tank remains less than the valve release pressure and there is no loss of water;

the circulation of water is entirely natural and requires neither pump nor auxiliary units; and in the case of accidental braking at too high a speed or with too high a residual motor torque, the track does not overheat as long as all the water is not evaporated, which leaves a wide safety margin (but it is then necessary to refill the track with water and possibly to dry the machine).

We claim:

1. A braking device for a high-inertia rotor which rotates in a predetermined direction about an axis wherein the braking device comprises:

a circular braking track fixed coaxially on said rotor and composed of successive water-cooled metal segments, each segment constituting a closed chamber with an inlet and an outlet for the water;

a succession of stationary brake cylinders disposed adjacent to said track in a position suitable to thrust brake linings against said track;

a plurality of water tanks fixed on the rotor for supplying cooling water to said segments, each of said tanks being independently hydraulically interconnected with at least one given segment, each said tank being disposed radially nearer to the axis of the rotor than said respective interconnected given segment and being oriented angularly to the rear of said given segment relative to the direction of rotation of the rotor, whereby both centrifugal force and the deceleration force due to braking tend to urge water from said tank towards said given segment; and inlet pipes and outlet pipes which connect said tank respectively to said inlet and to said outlet of said given segment to form a segment cooling circuit and to allow water to circulate in said circuit by the thermosiphonic effect which results firstly from the rise in temperature of the water in the segment during braking and secondly from the presence of centrifugal and deceleration forces.

2. A braking device according to claim 1, whose rotor axis is vertical, and wherein each tank is disposed above its corresponding segment so that the thermosiphonic effect can result not only from the presence of centrifugal and deceleration force when the rotor is still rotating but also, even after the rotor has stopped, from the presence of the force of gravity.

3. A braking device according to claim 1, wherein said outlet pipe is located substantially ahead of said inlet pipe relative to the direction in which said rotor rotates, whereby the reduction in the rotor's speed of rotation at the time of braking sets up an inertia effect which makes the water circulate in the cooling circuit formed by said pipes, said segment and said tank.

4. A braking device according to claim 2, wherein the upper part of the tank is provided at some distance from said inlet and outlet pipes, and said upper part bears a value to allow water vapour to escape when the pressure rises above a predetermined limit.

5. A device according to claim 1, wherein each segment has internal cavities whose walls maintain the shape of the segment while increasing the heat exchange surface area with the water, and means for communicating said cavities with one another to allow the water to circulate.

* * * * *